Nov. 25, 1941.   N. V. SMITH ET AL   2,263,653
SEALING MEANS
Filed Jan. 3, 1939
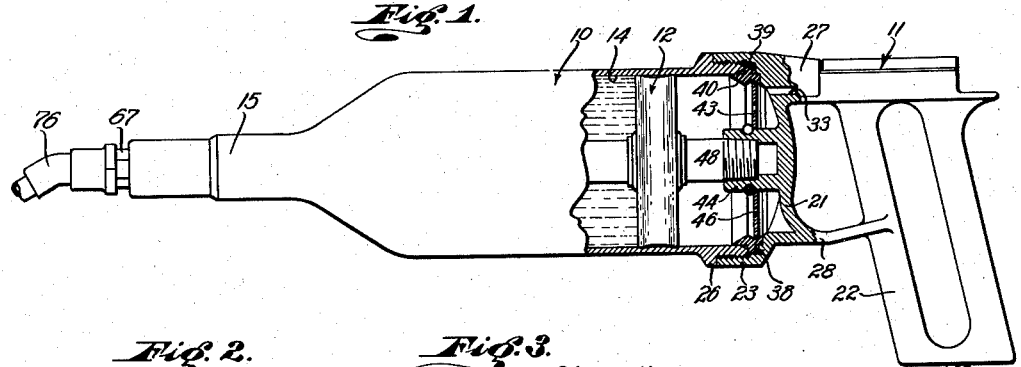
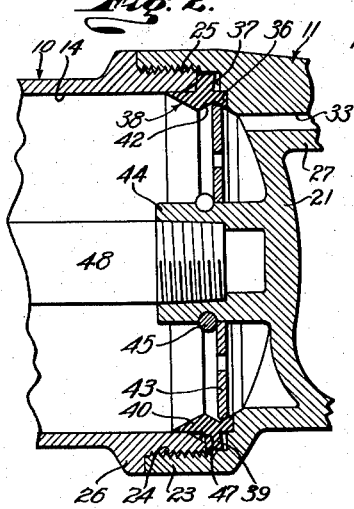
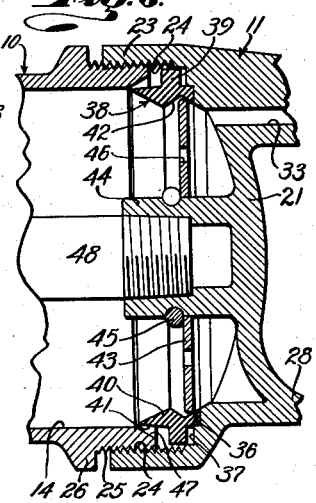
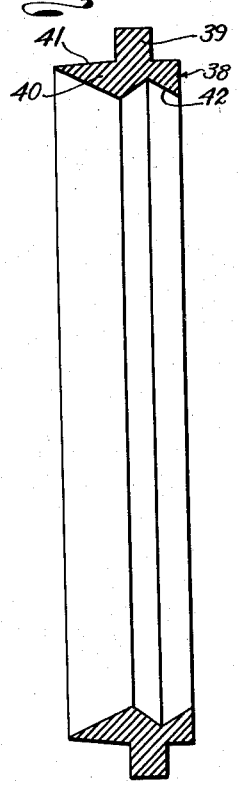
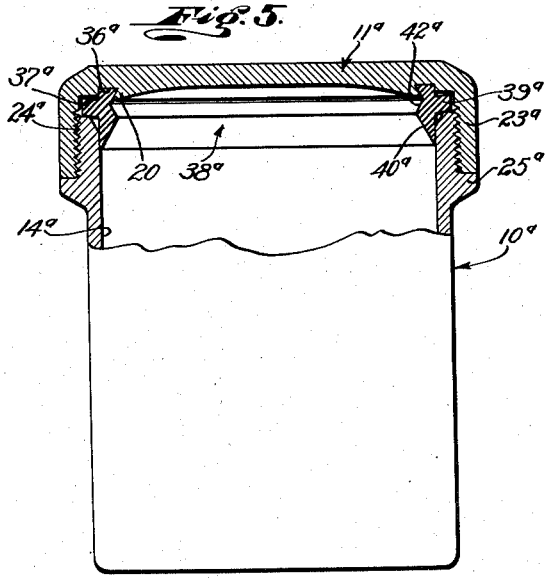
Inventors
NEIL V. SMITH
and CARL W. STOLL
By
His Attorney Patented Nov. 25, 1941

2,263,653

UNITED STATES PATENT OFFICE 2,263,653

SEALING MEANS

Neil V. Smith and Carl W. Stoll, Los Angeles, Calif.

Application January 3, 1939, Serial No. 249,043

10 Claims. (Cl. 220—46)

This invention relates to packing means or sealing means and relates more particularly to sealing means for sealing between the separable parts of grease guns and other devices. A general object of this invention is to provide a sealing means of the character mentioned that is simple, positive and dependable.

This application is a continuation in part of application Serial No. 203,840, filed April 2, 1938, entitled Grease gun, now matured into Patent No. 2,178,004, dated Oct. 31, 1939.

Another object of this invention is to provide a sealing means for sealing between two detachably connected parts, for example, two threadedly connected parts, that does not in any way interfere with the easy connection and separation of the parts and does not depend for its effectiveness or tightness upon the relative positions assumed by the parts when connected.

Another object of this invention is to provide novel and particularly effective sealing means for sealing between the separable parts of a lubricant gun which maintains the charging or priming pressure in the gun indefinitely, yet allows the parts to be easily disconnected and to be quickly reconnected in the proper relation.

Another object of this invention is to provide a grease gun embodying packing means or sealing means of the character referred to employed at the connection between the grease gun body and the handle section of the gun that is such that the handle section may remain in the correct alignment with the body and discharge nozzle of the gun after extended use of the gun, yet positively prevents the leakage or loss of lubricant and pressure from between the body and handle section when the parts are connected in the proper alignment.

Another object of this invention is to provide a dependable packing means or sealing means for embodiment in the connection between the body and handle section of a grease gun that does not depend for its tightness upon the extent or amount of threading together of the parts whereby a positive stop means may be employed to insure the correct alignment of the nozzle and handle with the assurance that the sealing means will remain effective.

A further object of this invention is to provide a sealing means embodying a sealing member or gasket that is maintained in tight sealing engagement with the connected parts by its inherent resiliency and by the pressure contained in the connected parts.

The various objects and features of our invention will be fully understood from the following detailed description of typical preferred forms and applications of the invention, throughout which description reference is made to the accompanying drawing, in which:

Fig. 1 is a side elevation of a lubricant gun with a portion broken away to illustrate the sealing means of the present invention embodied in the connection between the gun body and the handle section. Fig. 2 is an enlarged fragmentary vertical detailed sectional view illustrating the connection between the grease gun body and the handle section and showing the sealing gasket in its active sealing condition. Fig. 3 is a view similar to Fig. 2 showing the relationship between the parts when the connection is partially made up. Fig. 4 is an enlarged longitudinal detailed sectional view of the sealing gasket removed from the lubricant gun illustrated in Figs. 1, 2 and 3, and Fig. 5 is a side elevation of a container with a portion broken away to illustrate the sealing means of the present invention sealing between the container body and the closure.

The packing means or sealing means of the present invention is adapted to be embodied in devices and assemblies of various natures. The sealing means is well suited for embodiment in lubricant guns of the general class described in our co-pending application referred to above. Accordingly, in Figs. 1 to 4, inclusive, of the drawing we have illustrated the sealing means associated with a grease gun of the character just referred to. In Fig. 5 we have illustrated another typical use or application of the invention. The typical embodiments and applications of the invention illustrated in the drawing will be fully described in the following detailed description, it being understood that the invention is not to be construed as limited or restricted to the particular embodiments and applications herein illustrated and described.

The lubricant gun structure illustrated in Figs. 1 to 4, inclusive, includes a container or body 10 for holding a supply of lubricant under pressure and a cap and handle section 11 detachably secured to the rear end of the body 10. Lubricant ejecting means is contained in the reduced forward portion 15 of the body 10 and includes a plunger or ram 67 projecting from the forward end of the body. The ram 67 is related to the body 10 to remain in a given rotative position with respect ot the body. A laterally bent or curved forwardly projecting nozzle part 76 extends from the ram 67 to discharge the ejected lubricant. A follower 12 is shiftable in the body 10 to feed or force the lubricant to the ejecting means in the forward portion of the body.

The above mentioned section 11 includes a cap 21 for closing the rear end of the body 10. A central boss 44 is provided on the forward or inner side of the cap 21 and carries a guide 48 for the shiftable follower 12. A hollow handle 22 is connected with the cap 11 by webs 27 and 28 and projects downwardly and rearwardly for convenient engagement by the user of the gun. A valved fitting 35 is provided for admitting air under pressure to the handle 22 and a port 33 leads from the interior of the handle 22 to the opening 14 in the body 10 to deliver the air under pressure to the body. This air under pressure acts on the follower 12 to move it forwardly against the lubricant in the opening 14.

The cap and handle section 11 is detachably or removably secured to the gun body 10. The connection between the section 11 and the body 10 includes a forwardly projecting tubular flange 23 on the cap 21 and an internal thread 24 on the flange 23 for mating with a thread 25 on the body 10. An annular bead or flange 26 is provided on the exterior of the body 10 at the forward end of its thread 25. The flange 26 is engageable by the forward end of the cap flange 23 to limit the threading of the section 11 on the body 10. It will be observed that the flange 26 forms a positive stop adapted to limit turning or threading of the section 11 on the body 10. As illustrated in Fig. 1 of the drawing the parts are related so that the depending handle 11 and the bent or angular nozzle part 76 lie in a common plane or are in the same rotative position when the forward end of the cap flange 23 is stopped against the body flange 26.

The improved packing means or sealing means of the present invention seals between the body 10 and the cap 21 to prevent the loss of pressure and the leakage of fluid at the above described connection between the cap and body. The sealing means includes or provides a forwardly facing socket 36 in the inner side of the cap 21. The socket 36 has a forwardly facing annular shoulder 37 for opposing the rear end of the body 10. The packing or sealing means further includes a flexible resilient sealing member or gasket 38. The gasket 38 may be formed of rubber, rubber composition, synthetic rubber or similar flexible resilient material. In accordance with the invention the gasket 38 is arranged or seated in the socket 36 and has a peripheral annular rib or flange 39 spaced in front or forwardly of the shoulder 37. The gasket flange 39 is proportioned to be received between the shoulder 37 and the rear end of the body 10.

The sealing member or gasket 38 has means for sealing or packing with the wall of the opening 14 in the body 10. The forward part of the gasket 38 is in the nature of a sealing lip 40 for sealing outwardly against the wall of the body opening 14. Prior to the attachment of the section 11 to the body 10 the external or peripheral surface 41 of the sealing lip 40 slopes or inclines forwardly and inwardly with respect to the longitudinal axis of the gasket. This information of the sealing lip 40 is best illustrated in Figs. 3 and 4 of the drawing. The inner surface of the sealing lip 40 may slope forwardly and outwardly with respect to the longitudinal axis of the gasket 38 to be in converging relation to the surface 41 and to provide the lip 40 with a bevelled or sharp forward edge. The external diameter of the lip 40 or at least the external diameter of the forward portion of the surface 41 is preferably slightly less than the diameter of the opening 14 of the body 10 prior to the connection of the section 11 to the body 10. The extreme rear end part of the opening 14 in the body 10 preferably has an outwardly flaring surface 47 to assist in guiding the sealing lip 40 into the body 10 when the section 11 is being secured to the body.

Means is provided for retaining the sealing gasket 38 in the cap 21 of the section 11. An annular groove 42 of V-shaped cross section is provided in the inner surface of the sealing gasket 38 and a retaining plate 43 is arranged to have its peripheral portion cooperate with the groove 42. The plate 43 is arranged on the boss 44 and is held against displacement and inward shifting by a split spring ring 45 engaged about the boss. Perforations 46 in the plate 43 maintain the port 33 in communication with the body opening 14. It will be seen how the cooperation of the retaining plate 43 with the groove 42 retains the sealing gasket 38 in place in the cap 21. The retaining plate 43 engaging in the groove 42 also assists in preventing buckling and undesirable distortion of the sealing gasket 38.

In accordance with the invention the external flange 39 on the sealing gasket 38 is free of and spaced from the shoulder 37 and is engageable by the rear end of the body 10 when the section 11 is connected to the body 10. The rear end of the sealing gasket 38 bears against the bottom wall of the socket 36 to space the flange 39 forwardly from the shoulder 37. This relationship between the shoulder 37 and the flange 39 is important as it allows the flange 39 to be distorted as will be subsequently described. The periphery of the flange 39 is preferably free or clear of the thread 24 and the internal surface of the flange 23.

When the section 11 is being threaded on the body 10 the forward face of the flange 39 comes into engagement with the rear end of the body 10 before the forward end of the cap flange 23 reaches the body stop flange 26. As the threading of the section 11 on the body 10 continues the cooperation of the flange 39 with the rear end of the body 10 results in flexing or rearward distortion of the flange 39. This distortion of the flange 39 produces a distortion in the body of the sealing gasket 38 and causes the sealing lip 40 to move outwardly or expand. This brings the external surface 41 of the lip 40 into sealing cooperation with the wall of the opening 14. The periphery of the retaining plate 43 engages in the groove 42 to form a fulcrum during the outward pivoting of the sealing lip 40. By the time the forward end of the flange 23 has reached the stop flange 26 the gasket 38 has been distorted to the condition or shape shown in Fig. 2 of the drawing and has its lip 40 in tight sealing engagement with the wall of the opening 14. The inherent resiliency of the distorted gasket 38 urges the surface 41 of the lip 40 outwardly into effective sealing engagement with the wall of the opening 14 to maintain a positive fluid-tight seal. The rear portion of the gasket 38 is in tight sealing engagement with the wall of the socket 36 and the gasket flange 39 is tightly held against the rear end of the body 10 so that the gasket 38 forms a dependable sealing element for preventing leakage from between the threaded together body 10 and section 11.

It is to be noted that the fluid-tight and pressure-tight seal provided by the gasket 38 does not depend upon the compression of the gasket between parts or surfaces of the body 10 and section 11. This is important as it allows the forward end of the cap flange 23 to be directly engaged against the metal stop flange 26 of the body 10 to definitely limit the threading of the section 11 on the body 10. The forward end of the flange 23 and the rear side of the stop flange 26 have direct metal to metal contact to positively limit the threading together of the body 10 and section 11. The flanges 23 and 26 may be related and machined to assure the proper positioning of the section 11 relative to the body 10 when their surfaces are brought together as just described to effect and insure the proper alignment of the handle 21 and the discharge nozzle part 76.

The sealing lip 40 of the gasket 38, in addition to being held in tight sealing engagement with the wall of the opening 14 by the resiliency of the distorted gasket, is urged outwardly against the wall of the opening 14 by the air pressure in the opening. The sealing gasket 38 is retained in the cap 21 by the plate 43 and does not require manual handling or manipulation when the section 11 is secured to and detached from the body 10. The sealing gasket 38 automatically assumes its effective sealing position when the section 11 is threaded onto the body 10.

In Fig. 5 of the drawing the sealing means of the present invention seals between a container 10$^a$ and a cover or closure 11$^a$ for the container. The closure 11$^a$ has a downturned annular flange 23$^a$ and the flange 23$^a$ and the body 10$^a$ have mating threads 24$^a$. An annular bead or flange 25$^a$ is provided on the body 10$^a$ to form a stop for the threaded-on closure 11$^a$. The inner or lower end of the flange 23$^a$ is adapted to directly engage against the flange 25$^a$ to limit the threading of the closure 11$^a$ on the body 10$^a$.

The sealing means of the invention illustrated in Fig. 5 of the drawing includes a sealing gasket 38$^a$. The gasket 38$^a$ is a flexible resilient member formed of rubber, rubber composition, synthetic rubber, or the like. The gasket 38$^a$ is of the same formation as the above described gasket 38 having an external annular flange 39$^a$, a sealing lip 40$^a$ and an internal groove 42$^a$. An annular recess or socket 36$^a$ is provided in the under side of the closure 11$^a$ to receive the upper end part of the gasket 38$^a$. An annular downwardly facing shoulder 37$^a$ on the inner side of the closure 11$^a$ opposes the flange 39$^a$ of the gasket 38$^a$. The gasket 38$^a$ is spaced from the flange 37$^a$ and is clear of the interior of the cap flange 23$^a$. Means is provided for retaining the sealing gasket 38$^a$ on the cap or closure 11$^a$. In the construction illustrated an annular lip or bead 20 on the inner side of the closure 11$^a$ engages in the groove 42$^a$ to retain the gasket in the closure. It is to be understood that other suitable means may be employed to retain the gasket in place, if desired. The sealing lip 40$^a$ of the gasket 38$^a$ is adapted to seal outwardly against the wall of the opening 14$^a$ in the container 10$^a$ and its outer surface may initially slope downwardly and inwardly toward the central longitudinal axis of the gasket. The lip 40$^a$ is proportioned to rather closely fit or enter the opening 14$^a$ when the closure 11$^a$ is applied to the container 10$^a$. The flange 39$^a$ of the sealing gasket 38$^a$ is adapted to engage against the upper end of the container 10$^a$.

When the cap or closure 11$^a$ is threaded on or applied to the container 10$^a$ the flange 39$^a$ is brought into engagement with the upper end of the container 10$^a$. As the threading of the closure 11$^a$ onto the container 10$^a$ continues the flange 39$^a$ is moved or flexed upwardly. This flexure of the flange 39$^a$ is accompanied by distortion of the gasket 38$^a$ and the distortion of the gasket brings the sealing lip 40$^a$ into tight engagement with the wall of the opening 14$^a$. The retaining lip or bead 20 serves as a fulcrum for the gasket 38$^a$ when the gasket is distorted. The gasket 38$^a$ is such that its resiliency maintains the lip 40$^a$ in tight sealing contact with the wall of the opening 14$^a$ so long as the flange 39$^a$ is flexed or distorted upwardly through contact with the upper end of the container 10$^a$. The closure 11$a$ may be threaded down until the lower end of its flange 23$^a$ engages the stop flange 25$^a$. It is to be observed that this engagement of the flange 23$^a$ with the stop flange 25$^a$ positively limits the threading of the closure 11$^a$ on the body 10$^a$. The sealing action of the distorted gasket 38$^a$ is not dependent upon the extent of threading of the closure 11$^a$ on the body 10$^a$ and is not dependent upon compression forces resulting from the threading of the closure on the container.

Having described only typical preferred forms and applications of our invention, we do not wish to be limited or restricted to the specific details herein set forth, but wish to reserve to ourselves any variations or modifications that may appear to those skilled in the art or fall within the scope of the following claims:

Having described our invention, we claim:

1. In a construction of the character described, a container, a closure for an end of the container, means for detachably securing the closure to the body, and a distortable resilient sealing member carried by the closure including a portion bearing against the closure, a sealing part for sealing radially outward against the inner wall of the container, and a part projecting outwardly at a point between said portion and the sealing part engaged by the container only to have a lever action on the sealing member so that the sealing part is urged radially outward into sealing engagement with the inner wall of the container by the resiliency of the distorted member when the closure is being connected with the body by said means.

2. In a construction of the character described, a container, a closure for the container, means for detachably securing the closure to the container, and a distortable resilient sealing member on the closure for sealing with the container, the sealing member including a portion at one end of the member abutting the closure, a sealing part at the other end of the member for sealing with the internal surface of the container, and an outwardly projecting part between the ends of the member engageable only by the end of the container to have a lever action on the sealing member whereby the sealing part is urged outwardly into sealing cooperation with the said surface when the closure is secured to the container.

3. In combination, a body having a fluid opening, a closure for the opening, threads for detachably securing the closure to the body, a distortable sealing gasket on the closure including a portion at one end of the gasket bearing against the inner side of the closure, a part on the other end of the gasket entering the body to seal with the wall of the opening, and a part projecting outwardly between the ends of the gasket forcibly engaged by an end of the body while remaining clear of the closure when the closure is threaded on the body to distort the gasket so that the sealing part is urged radially outward against the wall of the opening.

4. In a combination, a body having a fluid opening, a closure for the opening, threads for detachably securing the closure to the body, engageable stop parts on the body and closure for limiting threading together of the closure and the body, and a distortable sealing gasket on the closure including a portion secured to the closure, a sealing portion for entering the body to seal with the wall of the body opening, and a portion projecting outwardly between the ends of the gasket and forcibly engaged only by the end of the body during threading together of the body and closure to distort the gasket and thus urge the sealing portion radially outward into sealing engagement with the wall of the opening before the stop parts engage to limit the threading together of the body and closure.

5. In combination, a body having a fluid containing opening, a closure for application to an end of the body, threads on the body and closure for detachably securing the closure to the body, the closure being adapted to extend across the end face of the body, stop parts on the body and closure for limiting threading of the closure on the body, and a distortable sealing gasket including a part secured to the closure, a sealing lip for entering the body to seal with the wall of the opening, and an external flange forcibly engaged by the said end face of the body when the closure is threaded on the body to distort the gasket so that the sealing lip is tightly forced against the wall of the opening, the stop parts being engageable to prevent the inner face of the closure from contacting the external flange.

6. In combination, a body having a fluid opening, a closure for the opening, threads for detachably securing the closure to the body, engageable stop parts on the body and closure for limiting threading together of the closure and the body, and a distortable sealing gasket on the closure including a portion recessed into the inner side of the closure, a sealing portion for entering the body to seal with the wall of the body opening, and an external flange forcibly engaged only by the end of the body to have a lever-like action on the gasket thereby causing the sealing portion to be urged radially outward into sealing engagement with the wall of the opening during threading together of the body and closure and before the stop parts engage to limit the threading together of the body and closure, the stop parts being engageable to prevent the inner side of the closure from engaging the flange.

7. In a grease gun, a body having an opening for holding lubricant, a section at an end of the body, threads on the body and section for detachably connecting the section to the body, stop parts on the body and section for limiting the threading together of the body and section to obtain a given rotative relationship between the body and section, and a gasket deformed by the body and section to seal with the wall of said opening during said threading together of the body and section, the gasket including a portion bearing against the section, a sealing lip for entering the body opening, and a projection on the periphery of the gasket forcibly engaged by the end of the body only to have a lever-like action on the gasket which forces the lip outwardly against the wall of the opening when the body and section are threaded together, the stop parts being engageable to prevent the section from acting on the projection.

8. In combination, two fluid handling elements arranged in end to end relation to have their interiors in communication, means for connecting the elements, and sealing means comprising a sealing member of deformable resilient material including opposite end portions for entering the elements, and an outwardly projecting part between said end portions engaged only by the end of one of the elements to have a lever-like distorting action on the member which urges one of said end portions outwardly into sealing engagement with the interior of its respective fluid handling element.

9. In combination, two fluid handling elements arranged in end to end relation to have their interiors in communication, means for connecting the elements and operable to move the elements one toward the other, stop parts on the elements for limiting movement of the elements toward one another, and a deformable resilient annular sealing member comprising two end portions, each of said end portions entering one of the fluid handling elements, and a projection on the exterior of the sealing member engaged only by the end of one of the elements during said relative movement of the elements to distort the sealing member so that an end portion of the same is forced outwardly against the interior of said element, the stop parts serving to prevent the end of the other element from engaging the projection.

10. In a construction of the character described, an element having a fluid containing opening, a closure element for closing an end of the opening, means for detachably connecting the elements, and a deformable resilient sealing member comprising a part abutting against one of the elements, a part for sealing outwardly against the other element, and an outwardly projecting lever part engaged by said other element only, to deform the sealing member so that the second named part is urged outwardly into active sealing cooperation with said other element by the resiliency of the member when the elements are connected.

NEIL V. SMITH.
CARL W. STOLL.